US012311659B2

(12) United States Patent
Yamamoto

(10) Patent No.: US 12,311,659 B2
(45) Date of Patent: May 27, 2025

(54) PRINTING DEVICE

(71) Applicant: SEIKO EPSON CORPORATION, Tokyo (JP)

(72) Inventor: Kazutaka Yamamoto, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 18/533,385

(22) Filed: Dec. 8, 2023

(65) Prior Publication Data

US 2024/0190148 A1 Jun. 13, 2024

(30) Foreign Application Priority Data

Dec. 9, 2022 (JP) ................................ 2022-197209

(51) Int. Cl.
*B41J 11/70* (2006.01)
*B41J 11/04* (2006.01)

(52) U.S. Cl.
CPC ................ *B41J 11/70* (2013.01); *B41J 11/04* (2013.01)

(58) Field of Classification Search
CPC .................................. B41J 11/70; B41J 11/04
See application file for complete search history.

(56) References Cited

U.S. PATENT DOCUMENTS

2005/0024464 A1* 2/2005 Takagi ..................... B41J 15/04 347/104
2006/0008312 A1* 1/2006 Sago ..................... B41J 15/046 400/621
2007/0065217 A1* 3/2007 Yoshioka ............. B41J 11/0045 400/621
2011/0158731 A1* 6/2011 Suzuki ..................... B41J 11/70 400/621
2014/0125000 A1* 5/2014 Suzuki ..................... B41J 11/70 270/1.01
2016/0325565 A1* 11/2016 Smolenski ............. B41J 15/042

FOREIGN PATENT DOCUMENTS

JP 2011-136472 A 7/2011

* cited by examiner

*Primary Examiner* — David H Banh
(74) *Attorney, Agent, or Firm* — WORKMAN NYDEGGER

(57) ABSTRACT

A guide portion includes a first guide portion through which an uncut portion passes when recording paper is fed in a +Y direction by a feed roller after the recording paper is cut by a cutter, and a second guide portion through which a cut portion passes when the recording paper is fed in the +Y direction by the feed roller after the recording paper is cut by the cutter, and the second guide portion is positioned in the −Z direction with respect to the first guide portion.

5 Claims, 12 Drawing Sheets

PRINTING DEVICE

The present application is based on, and claims priority from JP Application Serial Number 2022-197209, filed Dec. 9, 2022, the disclosure of which is hereby incorporated by reference herein in its entirety.

BACKGROUND

1. Technical Field

The present disclosure relates to a printing device.

2. Related Art

Hitherto, there has been known a printing device including a platen roller for feeding recording paper, a cutter provided between the platen roller and a discharge port, and a guide member provided between the platen roller and the cutter as disclosed in JP-A-2011-136472. The platen roller can feed the recording paper in a first direction toward the discharge port and a second direction opposite to the first direction. The cutter cuts the recording paper in such a way as to form a cut portion and an uncut portion in the recording paper. The guide member prevents a leading edge of the recording paper from entering between the platen roller and the cutter.

When the recording paper is fed in the second direction in a state in which a first recording paper section, which is a section positioned in the first direction with respect to the cut portion and the uncut portion, is coupled to a section positioned in the second direction with respect to the cut portion and the uncut portion after the recording paper is cut by the cutter, there is a possibility that the first recording paper section is caught by the guide member provided between the cutter and the platen roller.

SUMMARY

A printing device according to the present disclosure includes: a feed roller that is configured to feed recording paper in a first direction toward a discharge port and a second direction opposite to the first direction; a cutter that is provided between the feed roller and the discharge port and cuts the recording paper in such a way as to form a cut portion and an uncut portion in the recording paper in a third direction intersecting the first direction; and a guide member that is provided between the feed roller and the cutter, in which the feed roller and the guide member are positioned in a fourth direction with respect to the recording paper fed between the feed roller and the cutter, a guide portion, which is an end portion of the guide member in a fifth direction opposite to the fourth direction, includes a first guide portion through which the uncut portion passes when the recording paper is fed in the second direction by the feed roller after the recording paper is cut by the cutter, and a second guide portion through which the cut portion passes when the recording paper is fed in the second direction by the feed roller after the recording paper is cut by the cutter, and the second guide portion is positioned in the fourth direction with respect to the first guide portion.

DESCRIPTION OF EMBODIMENTS

Hereinafter, a printing device 1, which is an embodiment of a printing device, will be described with reference to the accompanying drawings. The printing device 1 is used as, for example, a receipt printer. In the following description, directions based on an XYZ orthogonal coordinate system illustrated in each drawing will be used, but these directions are for convenience of description only and do not limit the following embodiments in any way. Further, the number of components is merely an example, and does not limit the following embodiments in any way.

External Configuration of Printing Device

Figure 1:
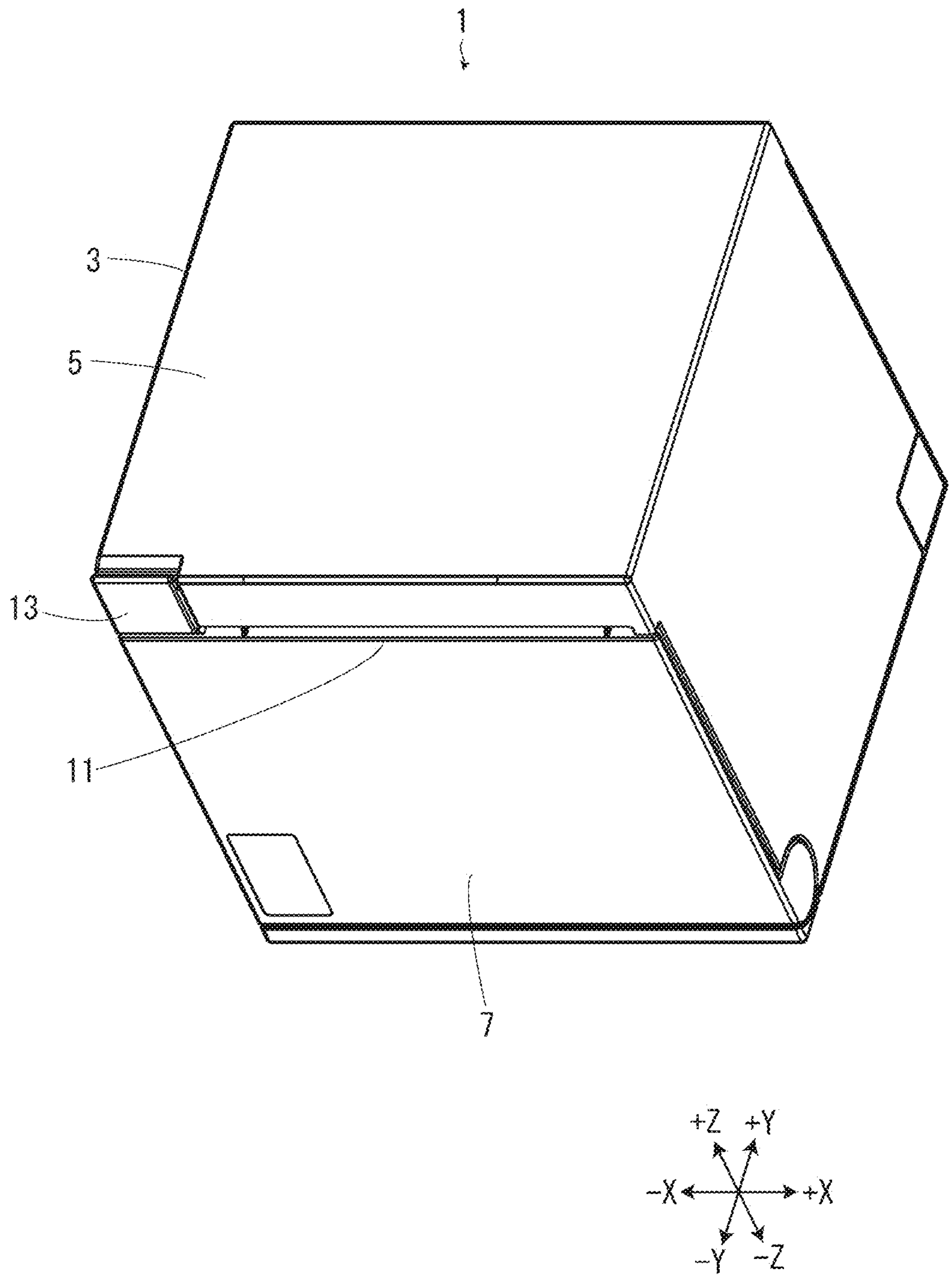
FIG. 1 is a perspective view of a printing device.

An external configuration of the printing device 1 will be described based on FIG. 1. The printing device 1 includes a device case 3. The device case 3 is formed in a substantially rectangular parallelepiped box shape, and forms an outer shell of the printing device 1.

The device case 3 includes a case body 5 and an opening/closing cover 7. The case body 5 is formed in a substantially rectangular parallelepiped shape of which a surface in a −Y direction is opened. The opening/closing cover 7 opens and closes a paper roll container 15 (see FIG. 2) to be described later. The opening/closing cover 7 is rotatably attached to a cover rotation shaft 9 (see FIG. 2).

A discharge port 11 is provided in the surface of the device case 3 in the −Y direction. The discharge port 11 is formed in a substantially rectangular shape elongated in an X direction. The discharge port 11 is provided between a distal end portion of the opening/closing cover 7, that is, an end portion of the opening/closing cover 7 in a +Z direction, and the case body 5. Printed recording paper 101 (see FIG. 2) is discharged from the discharge port 11.

An open lever 13 is provided at a corner in a −X direction and a +Z direction on the surface of the case body 5 in the −Y direction. A user can open the opening/closing cover 7 by operating the open lever 13.

Internal Configuration of Printing Device

Figure 2:
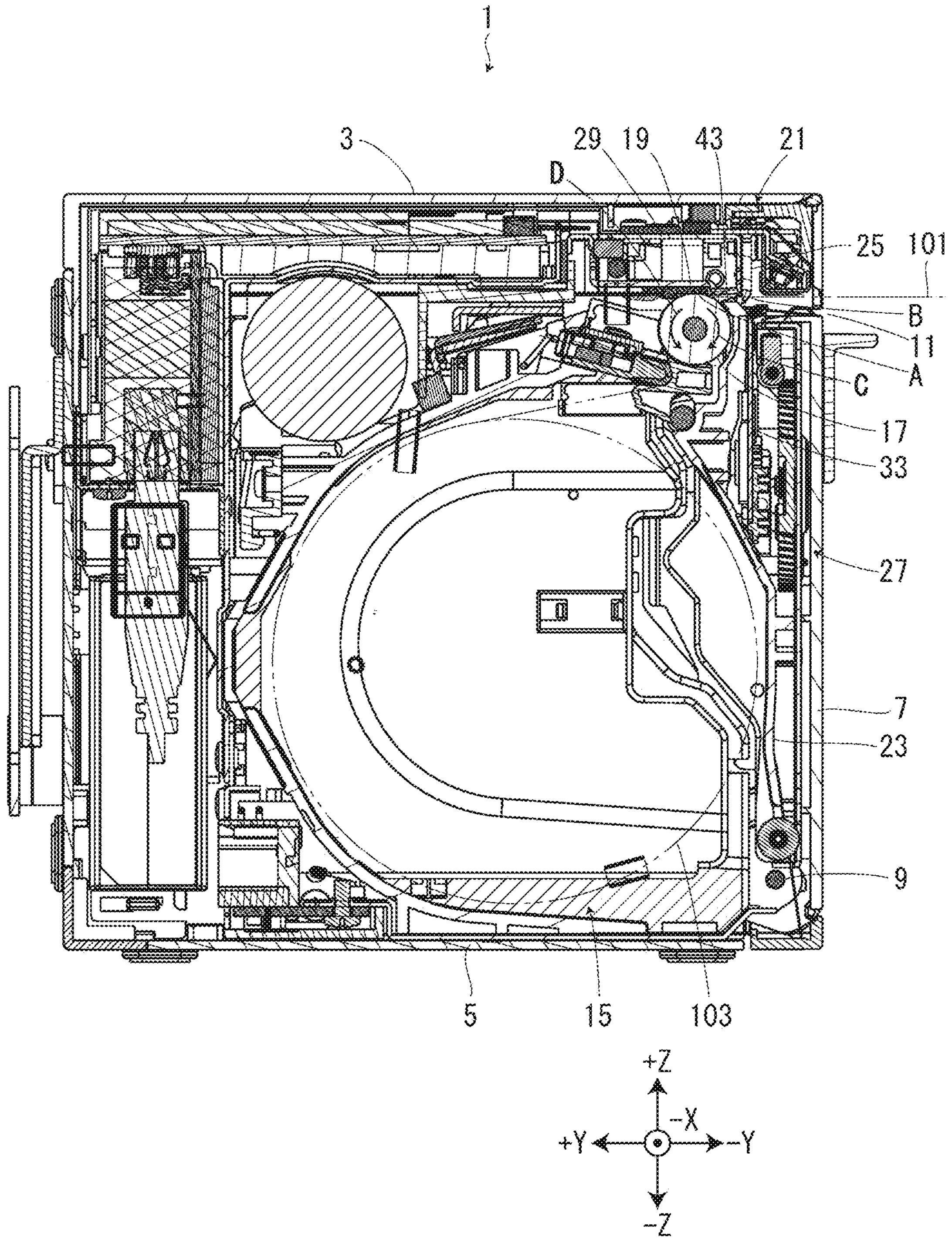
FIG. 2 is a cross-sectional view of the printing device taken along a plane parallel to a YZ plane.

An internal configuration of the printing device 1 will be described based on FIGS. 2 and 3. The paper roll container

15 is provided in the device case 3. The paper roll container 15 can contain a paper roll 103 in which the recording paper 101 as a print medium is wound. The paper roll 103 is loaded into the paper roll container 15 by a drop-in method in such a way that a rotation axis direction of the paper roll 103 is parallel to the X direction. The maximum width of the paper roll 103 that can be contained in the paper roll container 15, that is, the maximum dimension of the paper roll 103 in the X direction is, for example, 80 mm. Example of the recording paper 101 include thermal paper.

The printing device 1 includes a platen roller 17, a thermal head 19, a cutter 21, and a guide member 23. The cutter 21 includes a fixed blade 25 and a movable blade unit 27. The platen roller 17, the guide member 23, and the movable blade unit 27 are provided on an inner side of the opening/closing cover 7 and positioned in a −Z direction with respect to the recording paper 101 fed between the platen roller 17 and the cutter 21 in a state in which the opening/closing cover 7 is closed. The thermal head 19 and the fixed blade 25 are provided on an inner side of the case body 5 and positioned in the +Z direction with respect to the recording paper 101 fed between the platen roller 17 and the cutter 21.

The platen roller 17 is rotatably provided in such a way that a rotation axis direction of the platen roller 17 is the X direction. The platen roller 17 is positioned in the −Z direction with respect to the thermal head 19 and faces the thermal head 19. The recording paper 101 pulled out from the paper roll 103 contained in the paper roll container 15 is pinched between the platen roller 17 and the thermal head 19. A position where the recording paper 101 is pinched by the platen roller 17 and the thermal head 19 in a feeding path for the recording paper 101 from the paper roll container 15 to the discharge port 11 is referred to as a pinching position A.

The platen roller 17 can feed the recording paper 101 pinched between the platen roller 17 and the thermal head 19 in a direction toward the discharge port 11, that is, the −Y direction, and in a +Y direction opposite to the −Y direction. The platen roller 17 is rotatable in a first rotation direction C and a second rotation direction D opposite to the first rotation direction C by using a feed motor (not illustrated) as a drive source. When the platen roller 17 rotates in the first rotation direction C, the recording paper 101 is fed in the −Y direction, and when the platen roller 17 rotates in the second rotation direction D, the recording paper 101 is fed in the +Y direction. Feeding the recording paper 101 in the −Y direction by the platen roller 17, that is, feeding the recording paper 101 toward the discharge port 11 is also referred to as “forward feeding”. Feeding the recording paper 101 in the +Y direction by the platen roller 17, that is, feeding the recording paper 101 in such a way as to be pulled back into the device case 3 from the discharge port 11 is also referred to as “backward feeding”.

The thermal head 19 includes a plurality of heating elements (not illustrated), and generates heat based on print data received from an external device such as a personal computer (PC) or a tablet terminal, thereby printing a print image on the recording paper 101 pulled out from the paper roll 103.

The cutter 21 is provided between the platen roller 17 and the discharge port 11. The cutter 21 cuts the recording paper 101 in a direction intersecting the −Y direction, that is, the X direction, when printing is finished. As a result, the recording paper 101 is cut in a paper width direction E behind the print image. The paper width direction E means a width direction of the recording paper 101. Further, a position where the cutter 21 cuts the recording paper 101 in the feeding path for the recording paper 101 is referred to as a cutting position B. The cutting position B is positioned between the pinching position A and the discharge port 11.

The cutter 21 includes the fixed blade 25 and the movable blade unit 27 as described above. The fixed blade 25 is fixed to a frame 29 provided inside the case body 5. A fixed blade side cutting edge 31 is provided at an end portion of the fixed blade 25 in the −Z direction. The fixed blade side cutting edge 31 extends in the X direction and is formed in a straight line shape (see FIG. 3).

The movable blade unit 27 includes a movable blade 33 and a cutter motor (not illustrated). The movable blade 33 is positioned in the −Z direction with respect to the fixed blade 25 and faces the fixed blade 25. The movable blade 33 is movable in a Z direction between a standby position away from the fixed blade 25 and a cut position where the movable blade 33 is engaged with the fixed blade 25. The movable blade 33 is positioned at the standby position except during a cutting operation. At the time of the cutting operation, the movable blade 33 moves from the standby position to the cut position in the +Z direction, cuts the recording paper 101 between the movable blade 33 and the fixed blade 25, and then moves in the −Z direction from the cut position to return to the standby position. The fixed blade 25 may be referred to as a first blade, and the movable blade 33 may be referred to as a second blade.

Figure 3:
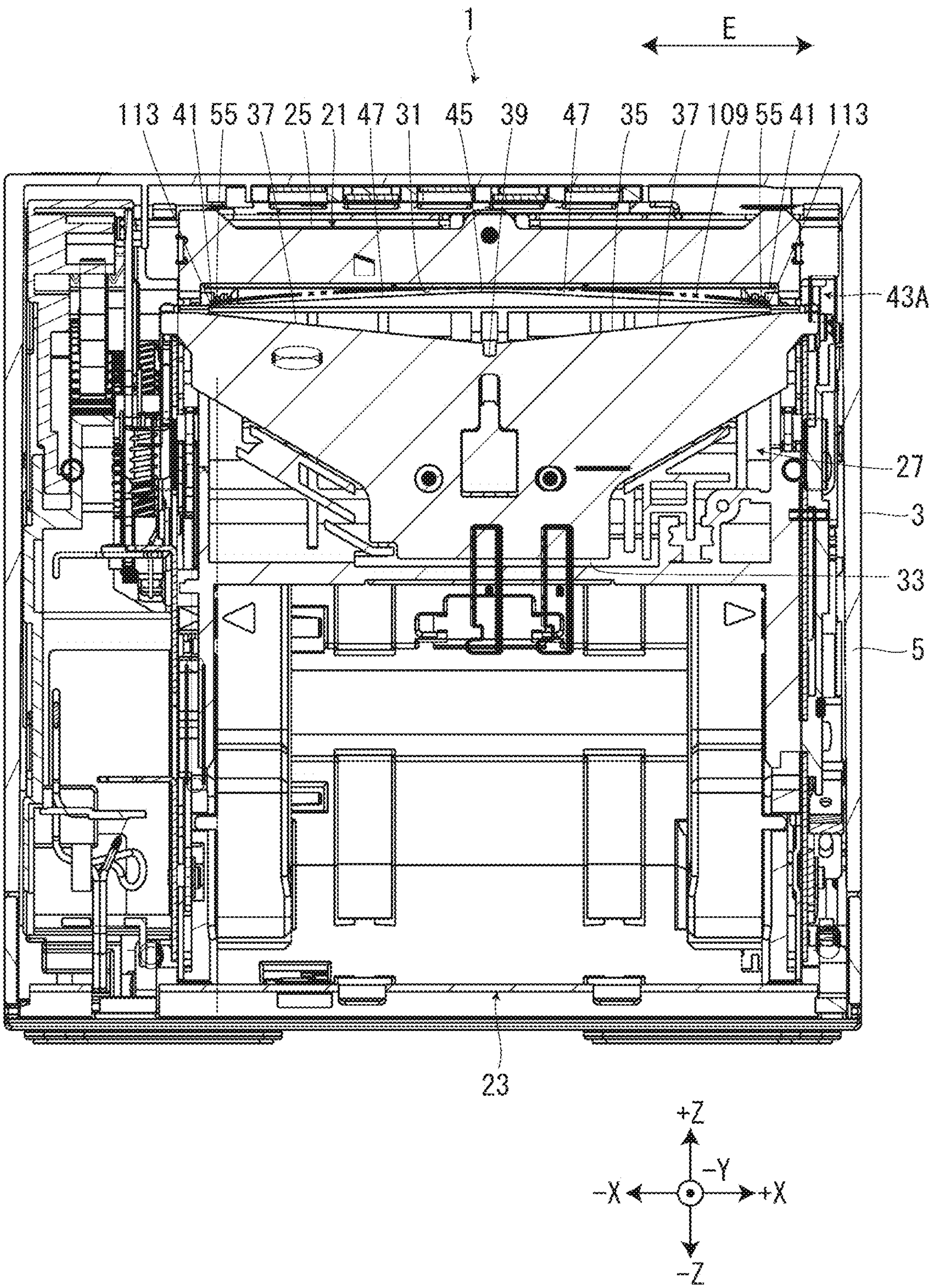
FIG. 3 is a cross-sectional view of the printing device including a guide portion according to a first embodiment, taken along a plane parallel to an XZ plane.

As illustrated in FIG. 3, the movable blade 33 is formed in a substantially “Y”-shaped plate shape when viewed from the −Y direction. A movable blade side cutting edge 35 is provided at an end portion of the movable blade 33 in the +Z direction. The movable blade side cutting edge 35 extends in the X direction and is formed in a substantially “V” shape. The movable blade side cutting edge 35 includes two blade portions 37 and a notch portion 39 provided between the two blade portions 37. The notch portion 39 is provided at an angled portion of the movable blade side cutting edge 35 formed in a substantially “V” shape, that is, at a substantially central portion of the movable blade side cutting edge 35 in the X direction. Portions of the movable blade side cutting edge 35 that are positioned at the same positions in the X direction as second B guide end portions 55 described later are referred to as second cutting edge portions 41. In the present embodiment, the second cutting edge portions 41 correspond to both end portions of the movable blade side cutting edge 35 in the X direction.

Figure 4:
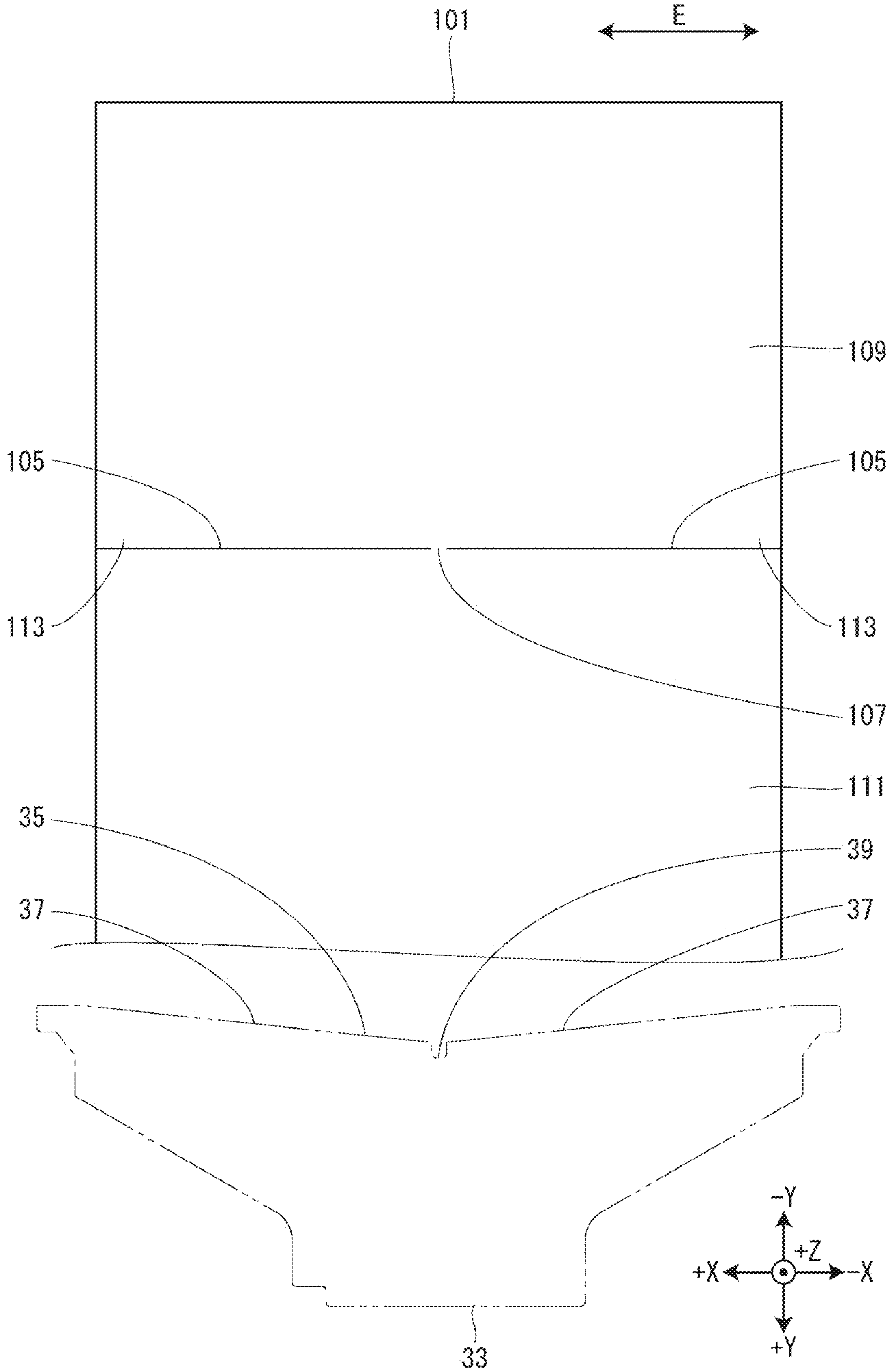
FIG. 4 is a view of recording paper cut by a cutter.
Figure 5:
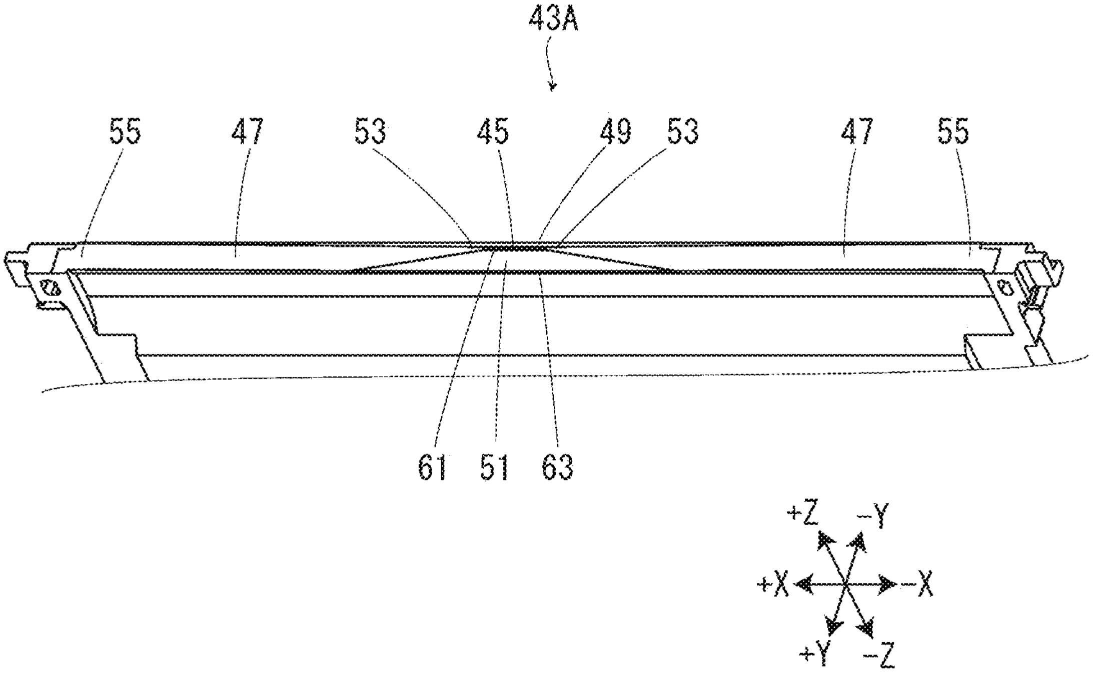
FIG. 5 is a perspective view of the guide portion according to the first embodiment.
Figure 6:
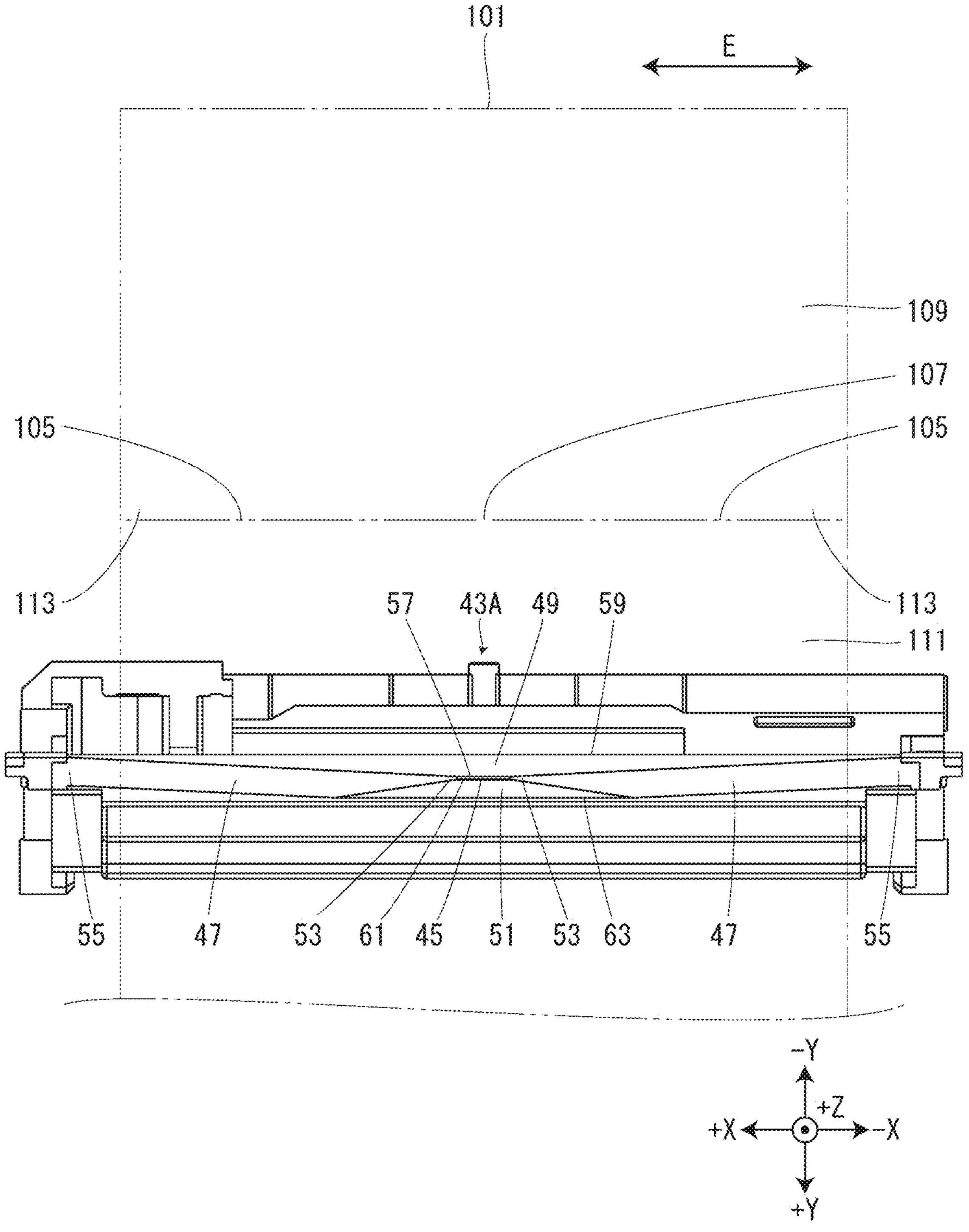
FIG. 6 is a view of the guide portion according to the first embodiment viewed from a +Z direction.
Figure 7:
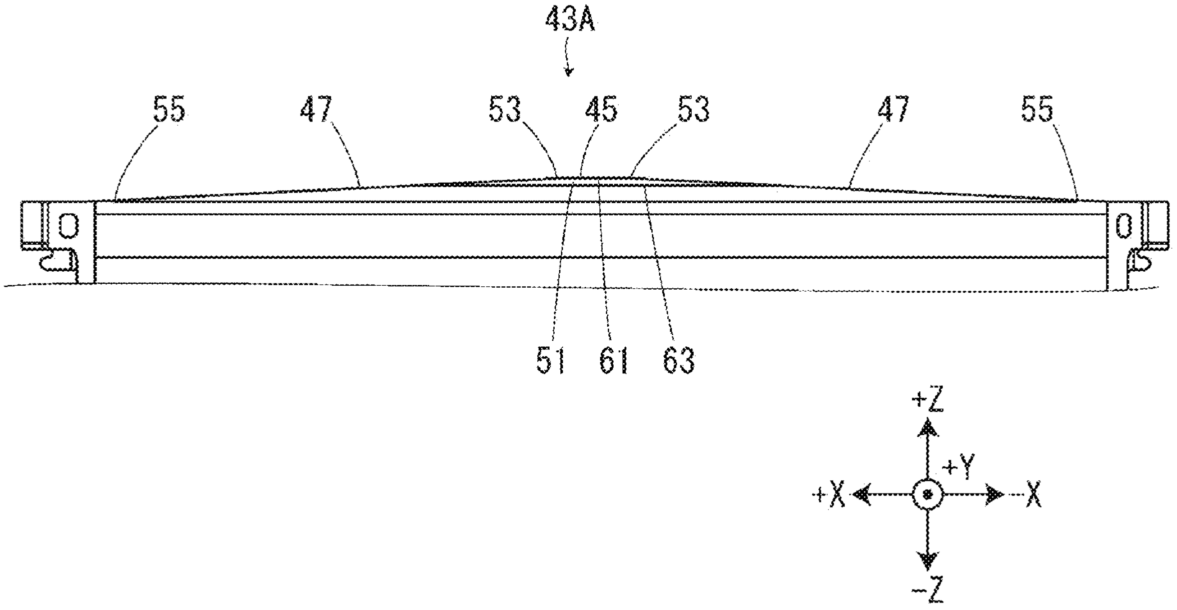
FIG. 7 is a view of the guide portion according to the first embodiment viewed from a +Y direction.
Figure 8:
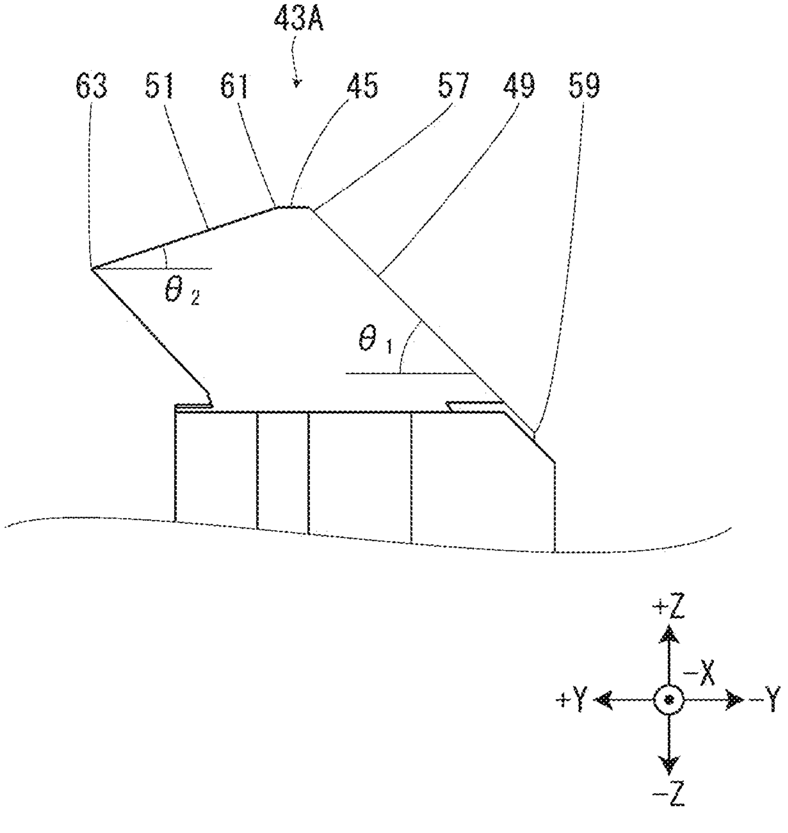
FIG. 8 is a view of the guide portion according to the first embodiment viewed from a −X direction.

As illustrated in FIG. 4, the cutter 21 cuts the recording paper 101 in such a way as to form two cut portions 105 and an uncut portion 107 in the recording paper 101 in the X direction, that is, the paper width direction E. That is, the cutter 21 cuts the recording paper 101 while leaving a part of the recording paper 101 uncut in the paper width direction E. In other words, in the recording paper 101, the two cut portions 105 are formed at positions corresponding to the two blade portions 37 of the movable blade side cutting edge 35, the uncut portion 107 is formed at a position corresponding to the notch portion 39 of the movable blade side cutting edge 35. Therefore, the two cut portions 105 are formed in a straight line shape extending in the X direction which is a direction in which the fixed blade side cutting edge 31 and the movable blade side cutting edge 35 extend, that is, the paper width direction E. The uncut portion 107 is formed between the two cut portions 105, that is, at a substantially central portion of the recording paper 101 in the paper width direction E.

In the recording paper 101 in which the cut portions 105 and the uncut portion 107 are formed, a section of the recording paper 101 on a leading edge side with respect to the cut portions 105 and the uncut portion 107 is referred to a first recording paper section 109, and a section of the recording paper 101 on a paper roll 103 side with respect to the cut portions 105 and the uncut portion 107 is referred to as a second recording paper section 111. Both end portions of the first recording paper section 109 in the paper width direction E that correspond to edge portions of the cut portions 105 are referred to as cut end portions 113.

The first recording paper section 109 is coupled to the second recording paper section 111 via the uncut portion 107. Therefore, the first recording paper section 109 does not drop from the discharge port 11 and stays in the discharge port 11. When the user takes out the first recording paper section 109 outside the device case 3 from the discharge port 11, the uncut portion 107 is torn and the first recording paper section 109 is separated from the second recording paper section 111. The taken out first recording paper section 109 is used as a receipt, for example. For example, when the user desires to use a plurality of first recording paper sections 109 in a coupled state, the next printing is performed in a state in which the first recording paper section 109 is not taken out by the user and is coupled to the second recording paper section 111.

For example, the platen roller 17 feeds the recording paper 101 in the +Y direction in the following cases. That is, after the recording paper 101 is cut by the cutter 21, the platen roller 17 feeds the recording paper 101 in the +Y direction by a length approximately the same as a distance between the pinching position A and the cutting position B in order to reduce a margin in front of the print image to be printed in the next printing. As a result, when the first recording paper section 109 is coupled to the second recording paper section 111 in the leading edge of the recording paper 101 positioned at the cutting position B, the leading edge of the second recording paper section 111 is positioned at the pinching portion A.

The guide member 23 extends in the −Z direction from between the platen roller 17 and the movable blade unit 27. The guide member 23 is positioned in the −Z direction, that is, on the same side as the platen roller 17 with respect to the recording paper 101 fed between the platen roller 17 and the cutter 21, as described above.

An end portion of the guide member 23 in the +Z direction is referred to as a guide portion 43. The guide portion 43 extends in the X direction, and the dimension of the guide portion 43 in the X direction is equal to or larger than the maximum width of the paper roll 103 that can be contained in the paper roll container 15. The guide portion 43 prevents the leading edge of the recording paper 101 from being caught by the platen roller 17 rotating in the first rotation direction C, and entering between the platen roller 17 and the movable blade unit 27 when the recording paper 101 is fed in the −Y direction from a state in which the leading edge of the recording paper 101 is positioned at the pinching position A. The guide member 23 also functions as a movable blade guide that guides movement of the movable blade 33 in the Z direction. Furthermore, the guide member 23 also functions as a wall portion of the paper roll container 15. The guide portion 43 may be described as an end portion in a direction from the guide member 23 toward the recording paper 101.

First Embodiment of Guide Portion

A guide portion 43A, which is a first embodiment of the guide portion, will be described with reference to FIGS. 5 to 8. When the guide portion 43A and a guide portion 43B of a second embodiment to be described later are not particularly distinguished, both are collectively referred to as the "guide portion 43".

The guide portion 43A is provided at the end portion of the guide member 23 in the +Z direction as described above. The guide portion 43A includes a first guide portion 45, two second guide portions 47, a first inclined portion 49, and a second inclined portion 51.

The first guide portion 45 is positioned most toward the +Z direction in the guide portion 43A and corresponds to a top portion of the guide portion 43A. The first guide portion 45 is formed in a straight line shape extending in the X direction when viewed from the +Z direction (see FIG. 6). The first guide portion 45 is provided between the two second guide portions 47 in the X direction. More specifically, the first guide portion 45 is provided at a position corresponding to the notch portion 39 of the movable blade 33 in the X direction, that is, at a substantially central portion of the guide portion 43A in the X direction (see FIG. 3). Therefore, the uncut portion 107 passes through the first guide portion 45 when the recording paper 101 is fed in the +Y direction in a state in which the first recording paper section 109 is coupled to the second recording paper section 111 after the recording paper 101 is cut by the cutter 21 (see FIG. 6). The uncut portion 107 may come into contact with the first guide portion 45, but is not limited thereto.

The two second guide portions 47 are provided on both outer sides of the first guide portion 45 in the X direction. The two second guide portions 47 are each formed in a substantially rectangular shape elongated in the X direction when viewed from the +Z direction (see FIG. 6). The two second guide portions 47 are provided at positions corresponding to the two blade portions 37 of the movable blade 33 in the X direction (see FIG. 3). Therefore, the two cut portions 105 pass through the two second guide portions 47 when the recording paper 101 is fed in the +Y direction in a state in which the first recording paper section 109 is coupled to the second recording paper section 111 after the recording paper 101 is cut by the cutter 21 (see FIG. 6).

An end portion of each second guide portion 47 that is adjacent to the first guide portion 45, that is, an end portion of each second guide portion 47 on an inner side in the X direction, is referred to as a second A guide end portion 53. Further, an end portion of each second guide portion 47 that is opposite from the first guide portion 45, that is, an end portion of each second guide portion 47 on an outer side in the X direction, is referred to as a second B guide end portion 55. The two second B guide end portions 55 are positioned at the same positions as the two second cutting edge portions 41 described above in the −Z direction (see FIG. 3). The position of the second cutting edge portion 41 in the −Z direction means the position of the second cutting edge portion 41 in the −Z direction in a state in which the movable blade 33 is positioned at the standby position. Further, the "same position" does not indicate mathematical precision, but is a concept that includes substantially permissible errors.

The two second guide portions 47 are positioned in the −Z direction with respect to the first guide portion 45. More specifically, the two second guide portions 47 are inclined in such a way that the second B guide end portion 55 is positioned in the −Z direction with respect to the second A guide end portion 53. In other words, the two second guide portions 47 are inclined in such a way that the second A guide end portion 53 is positioned in the +Z direction with respect to the second B guide end portions 55.

The first inclined portion 49 is provided in the −Y direction with respect to the first guide portion 45 and the two second guide portions 47. The first inclined portion 49 is formed in a substantially isosceles trapezoidal shape when viewed from the +Z direction (see FIG. 6). An end portion of the first inclined portion 49 that is adjacent to the first guide portion 45, that is, an end portion of the first inclined portion 49 in the +Y direction, is referred to as a first A inclined end portion 57. An end portion of the first inclined portion 49 that is opposite from the first guide portion 45, that is, an end portion of the first inclined portion 49 in the −Y direction, is referred to as a first B inclined end portion 59. The first B inclined end portion 59 is longer in the X direction than the first A inclined end portion 57. The first inclined portion 49 is inclined in such a way that the first A inclined end portion 57 is positioned in the +Z direction with respect to the first B inclined end portion 59.

An inclination angle $\theta_1$ of the first inclined portion 49 with respect to an XY plane is not particularly limited, and may be smaller than an inclination angle $\theta_2$ of the second inclined portion 51 to be described later, may be equal to the inclination angle $\theta_2$ of the second inclined portion 51, or may be larger than the inclination angle $\theta_2$ of the second inclined portion 51. In the present embodiment, the inclination angle $\theta_1$ of the first inclined portion 49 is, for example, 40 degrees or more and 50 degrees or less, and is larger than the inclination angle $\theta_2$ of the second inclined portion 51 (see FIG. 8). Therefore, the dimension of the second guide portion 47 in the Y direction can be reduced.

The second inclined portion 51 is provided in the +Y direction with respect to the first guide portion 45. The second inclined portion 51 is formed in a substantially isosceles trapezoidal shape that is smaller than the first inclined portion 49 when viewed from the +Z direction (see FIG. 6). An end portion of the second inclined portion 51 that is adjacent to the first guide portion 45, that is, an end portion of the second inclined portion 51 in the −Y direction, is referred to as a second A inclined end portion 61. An end portion of the second inclined portion 51 that is opposite from the first guide portion 45, that is, an end portion of the second inclined portion 51 in the +Y direction, is referred to as a second B inclined end portion 63. The second B inclined end portion 63 is longer in the X direction than the second A inclined end portion 61. The second inclined portion 51 is inclined in such a way that the second A inclined end portion 61 is positioned in the +Z direction with respect to the second B inclined end portion 63. The inclination angle $\theta_2$ of the second inclined portion 51 with respect to the XY plane is not particularly limited, and is, for example, 15 degrees or more and 20 degrees or less (see FIG. 8).

As described above, the second inclined portion 51 inclined in such a way that the second A inclined end portion 61 is positioned in the +Z direction with respect to the second B inclined end portion 63 is provided in the +Y direction with respect to the first guide portion 45. Therefore, in a case in which the recording paper 101 is fed in the −Y direction from a state in which the leading edge of the recording paper 101 is positioned in the +Y direction with respect to the guide portion 43A, even when the leading edge of the recording paper 101 abuts the second inclined portion 51, the leading edge of the recording paper 101 abutting on the second inclined portion 51 is fed in a direction between the −Y direction and the +Z direction along the second inclined portion 51. Accordingly, it is possible to prevent the recording paper 101 from being caught by the guide portion 43A.

By the way, as illustrated in FIG. 3, the first recording paper section 109 may be bent in such a way that the two cut end portions 113 are positioned in the −Z direction with respect to the uncut portion 107 after the recording paper 101 is cut by the cutter 21. It is considered that this is because the two cut end portions 113 are dragged in the −Z direction by the two second cutting edge portions 41 of the movable blade 33 when the movable blade 33 moves from the cut position to the standby position in the −Z direction.

Unlike the present embodiment, the first recording paper section 109 may be bent in such a way that the two cut end portions 113 are positioned in the −Z direction with respect to the uncut portion 107 even in a configuration in which the fixed blade 25 is provided on the same side of the recording paper 101 as the platen roller 17 and the guide portion 43A, that is, in the −Z direction, and the movable blade 33 is positioned on a side of the recording paper 101 that is opposite from the platen roller 17 and the guide portion 43A, that is, in the +Z direction. It is considered that this is because the two cut end portions 113 are pushed in the −Z direction by the two second cutting edge portions 41 of the movable blade 33 when the movable blade 33 moves from the standby position to the cut position in the −Z direction. In particular, when the printing device 1 is installed in a posture in which the −Z direction is a substantially vertical direction, the first recording paper section 109 is easily bent in such a way that the two cut end portions 113 are positioned in the −Z direction with respect to the uncut portion 107 due to gravity.

Figure 9:
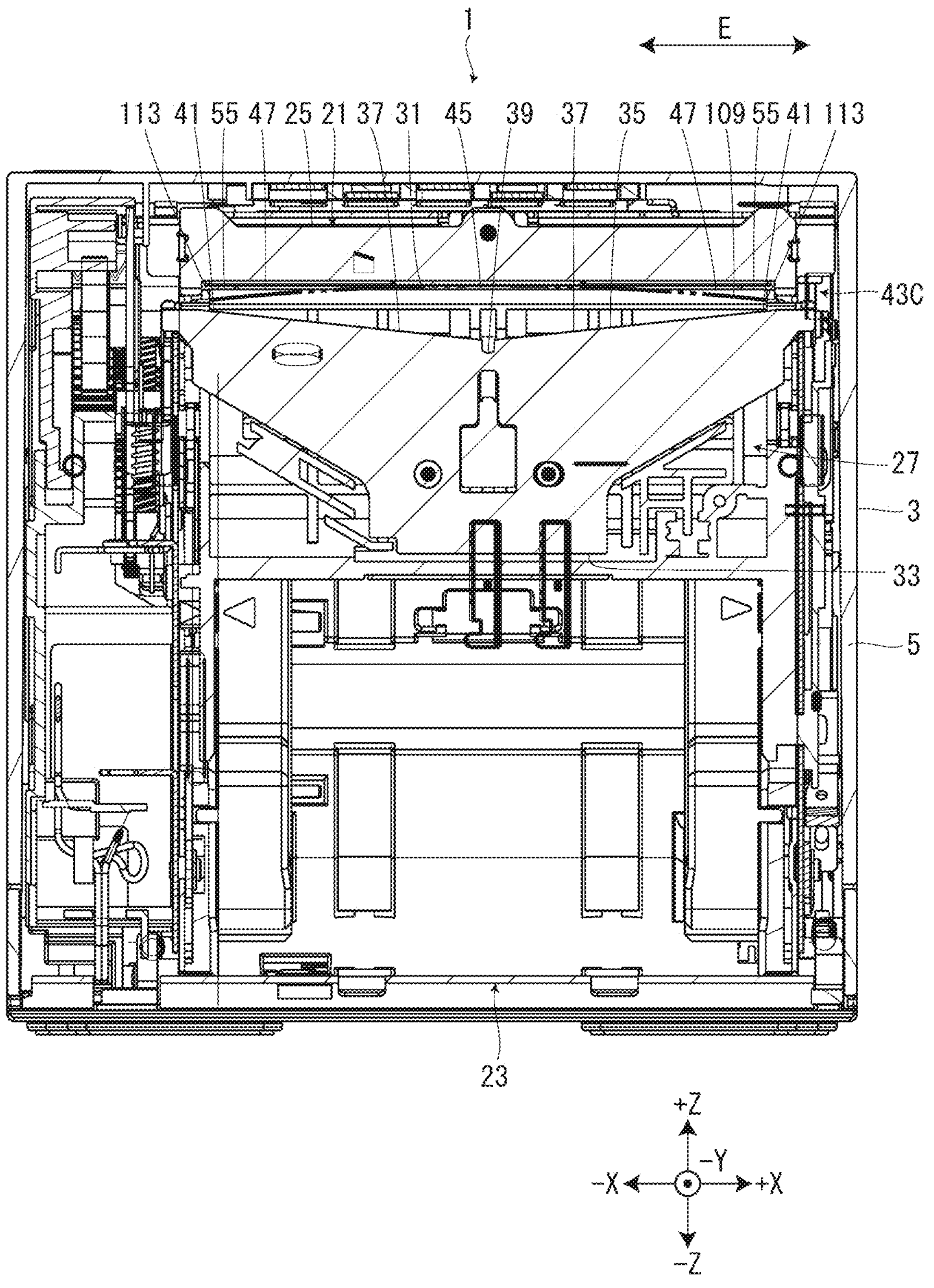
FIG. 9 is a cross-sectional view of the printing device including a guide portion according to a comparative example, taken along a plane parallel to the XZ plane.

Here, it is assumed that the printing device 1 includes a guide portion 43C instead of the guide portion 43A as illustrated in FIG. 9. In the guide portion 43C, two second guide portions 47 are formed in a straight line shape extending toward both outer sides from a first guide portion 45 in the X direction, and are provided on the same plane as the first guide portion 45. That is, the two second guide portions 47 are positioned at the same position in the Z direction with respect to the first guide portion 45. In this case, there is a possibility that the first recording paper section 109 bent in the −Z direction is caught by the guide portion 43C when the recording paper 101 is fed in the +Y direction in a state in which the first recording paper section 109 is coupled to the second recording paper section 111 after the recording paper 101 is cut by the cutter 21. That is, there is a possibility that at least one of the two cut end portions 113 positioned in the −Z direction with respect to the uncut portion 107 in the first recording paper section 109 may be caught by at least one of the two second guide portions 47. When the first recording paper section 109 is caught by the guide portion 43C, problems occur in feeding the recording paper 101. For example, the recording paper 101 cannot be fed any further in the −Y direction, or the uncut portion 107 is torn, and the first recording paper section 109 is thus separated from the second recording paper section 111.

On the other hand, in the guide portion 43A of the present embodiment, the two second guide portions 47 are positioned in the −Z direction with respect to the first guide portion 45, as described above. That is, the two cut end portions 113 positioned in the −Z direction with respect to the uncut portion 107 in the first recording paper section 109 are prevented from being caught by the two second guide portions 47. In this case, the first recording paper section 109 bent in the −Z direction can be prevented from being caught by the guide portion 43A when the recording paper 101 is fed in the +Y direction in a state in which the first recording paper section 109 is coupled to the second recording paper section 111 after the recording paper 101 is cut by the cutter 21.

As the second guide portions 47 are positioned in the −Z direction with respect to the first guide portion 45, it is possible to prevent the recording paper 101 from being caught by the guide portion 43A not only when the recording paper 101 is fed in the +Y direction, but also when the recording paper 101 is fed in the −Y direction. That is, in a case of some types of the recording paper 101, such as linerless label paper, the recording paper 101 may be bent in such a way that both end portions of the recording paper 101 in the paper width direction E are positioned in the −Z direction with respect to the central portion of the recording paper 101 at a time point when the recording paper 101 is pulled out from the paper roll 103 even before being cut by the cutter 21. Even in such a case, since the second guide portions 47 are positioned in the −Z direction with respect to the first guide portion 45, it is possible to prevent the recording paper 101 from being caught by the guide portion 43A when the recording paper 101 is fed in the −Y direction from a state in which the leading edge of the recording paper 101 is positioned in the +Y direction with respect to the guide portion 43A.

As described above, the two second B guide end portions 55 are positioned at the same positions as the two second cutting edge portions 41 in the −Z direction. Therefore, the two cut end portions 113 dragged by the second cutting edge portion 41 in the −Z direction are prevented from being positioned in the −Z direction with respect to the two second B guide end portions 55 when the recording paper 101 is fed in the +Y direction in a state in which the first recording paper section 109 is coupled to the second recording paper section 111 after the recording paper 101 is cut by the cutter 21. Accordingly, it is possible to more effectively prevent the first recording paper section 109 from being caught by the guide portion 43A.

Since the two second B guide end portions 55 are positioned at the same positions as the two second cutting edge portions 41 in the −Z direction, the recording paper 101 is prevented from being positioned more toward the −Z direction than the second cutting edge portions 41 when the recording paper 101 is fed in the −Y direction from a state in which the leading edge of the recording paper 101 is positioned in the +Y direction with respect to the guide portion 43A. Therefore, it is possible to prevent the recording paper 101 from being caught by the movable blade 33.

Further, the two second guide portions 47 are inclined in such a way that the second A guide end portion 53 is positioned in the +Z direction with respect to the second B guide end portions 55. Therefore, when the recording paper 101 is fed in the −Y direction from a state in which the leading edge of the recording paper 101 is positioned in the +Y direction with respect to the guide portion 43A, the leading edge of the recording paper 101 is prevented from entering between the platen roller 17 and the movable blade unit 27 not only by the first guide portion 45 but also by a portion of the second guide portion 47 that is near the second A guide end portion 53. Therefore, it is possible to more effectively prevent the leading edge of the recording paper 101 from entering between the platen roller 17 and the movable blade unit 27 as compared with a configuration in which the leading edge of the recording paper 101 is prevented from entering between the platen roller 17 and the movable blade unit 27 only by the first guide portion 45.

The first inclined portion 49, which is inclined in such a way that the first A inclined end portion 57 is positioned in the +Z direction with respect to the first B inclined end portion 59, is provided in the −Y direction with respect to the second guide portions 47. Therefore, in a case in which the recording paper 101 is fed in the +Y direction in a state in which the first recording paper section 109 is coupled to the second recording paper section 111 after the recording paper 101 is cut by the cutter 21, even when the cut end portion 113 abuts the first inclined portion 49, the cut end portion 113 abutting on the first inclined portion 49 is fed in a direction between the +Y direction and the +Z direction along the first inclined portion 49. Therefore, it is possible to more effectively prevent the first recording paper section 109 from being caught by the guide portion 43A. It is sufficient that the first inclined portion 49 be provided at a position corresponding to the second guide portions 47, and the first inclined portion 49 does not have to be provided at a position corresponding to the first guide portion 45. That is, instead of the first inclined portion 49, a surface perpendicular to the XY plane may be provided in the −Y direction with respect to the first guide portion 45.

As described above, the printing device 1 of the present embodiment includes the platen roller 17, the cutter 21, and the guide member 23. The platen roller 17 can feed the recording paper 101 in the −Y direction toward the discharge port 11 and in the +Y direction opposite to the −Y direction. The cutter 21 is provided between the platen roller 17 and the discharge port 11. The cutter 21 cuts the recording paper 101 in such a way as to form the cut portions 105 and the uncut portion 107 in the recording paper 101 in the X direction intersecting the −Y direction. The guide member 23 is provided between the platen roller 17 and the cutter 21. The platen roller 17 and the guide member 23 are positioned in the −Z direction with respect to the recording paper 101 that is fed between the platen roller 17 and the cutter 21. The guide portion 43A, which is the end portion of the guide member 23 in the +Z direction opposite to the −Z direction, includes the first guide portion 45 and the second guide portions 47. The uncut portion 107 passes through the first guide portion 45 when the recording paper 101 is fed in the +Y direction by the platen roller 17 after the recording paper 101 is cut by the cutter 21. The cut portions 105 pass through the second guide portions 47 when the recording paper 101 is fed in the +Y direction by the platen roller 17 after the recording paper 101 is cut by the cutter 21. The second guide portions 47 are positioned in the −Z direction with respect to the first guide portion 45.

According to the configuration, it is possible to prevent the first recording paper section 109, which is a section of the recording paper 101 on the leading edge side of the recording paper 101 with respect to the cut portions 105 and the uncut portion 107, from being caught by the guide portion 43A when the recording paper 101 is fed in the +Y direction in a state in which the first recording paper section 109 is coupled to the second recording paper section 111 after the recording paper 101 is cut by the cutter 21.

Second Embodiment of Guide Portion

Figure 11:
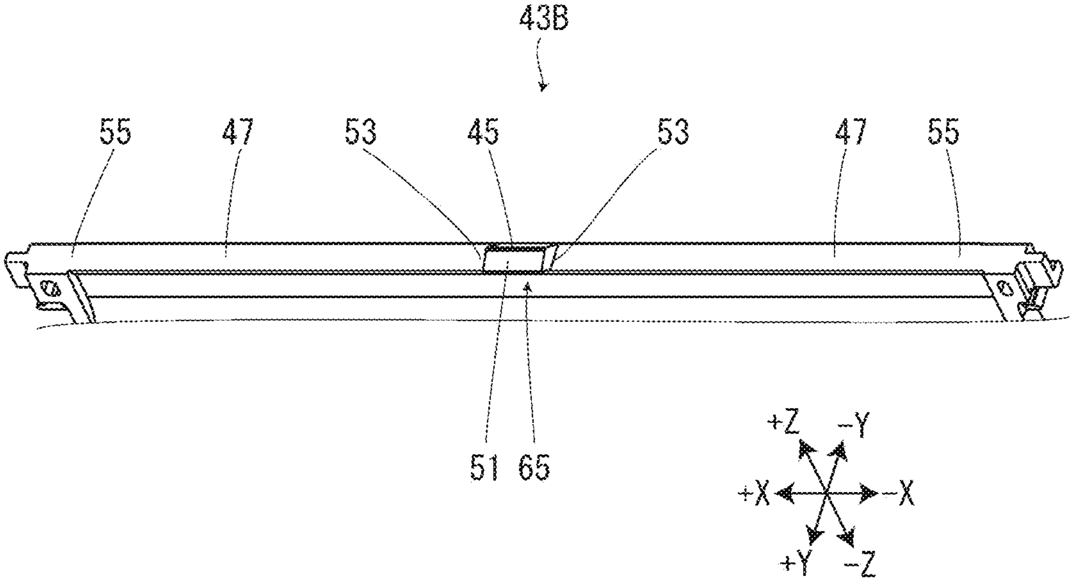
FIG. 11 is a perspective view of the guide portion according to the second embodiment.
Figure 12:
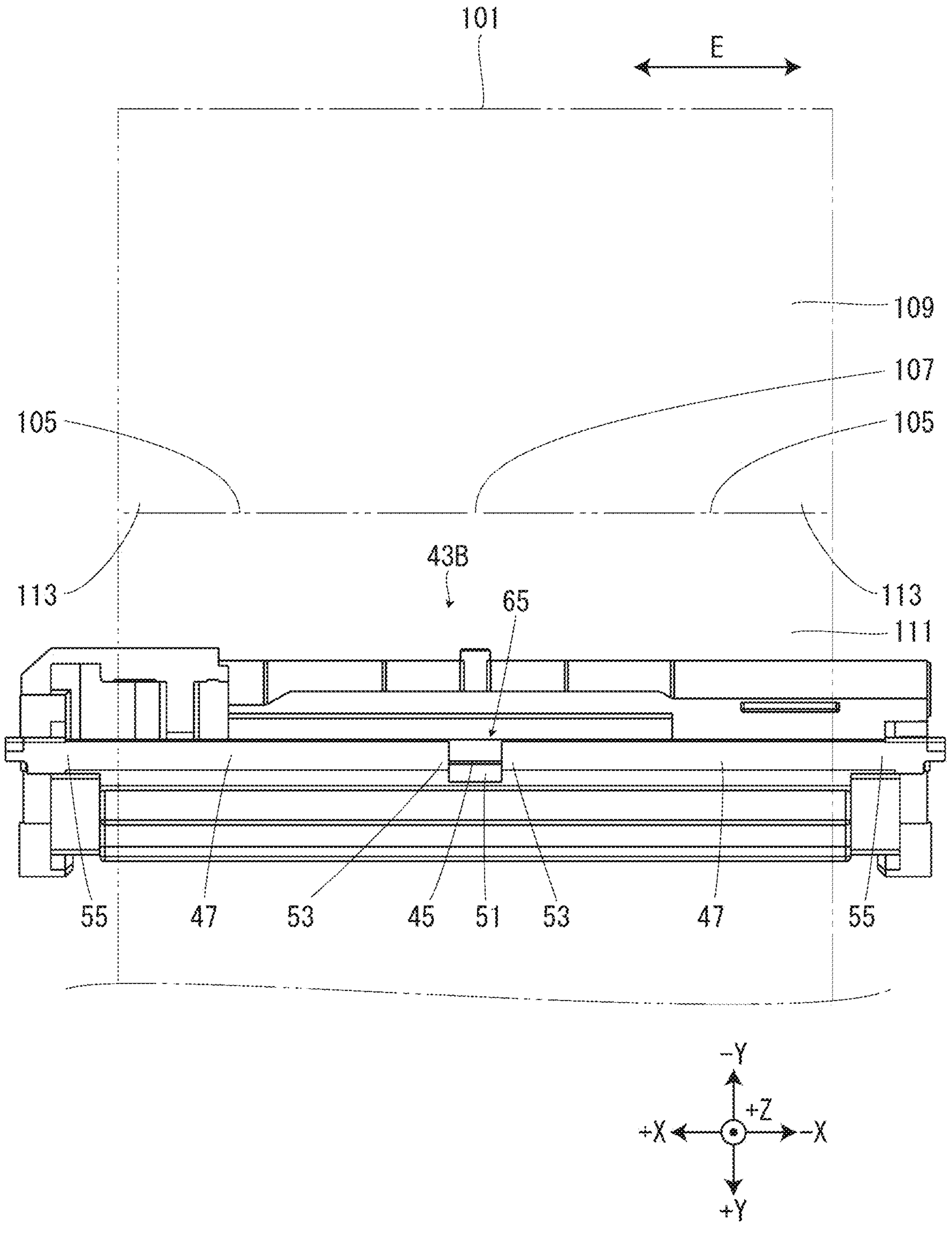
FIG. 12 is a view of the guide portion according to the second embodiment viewed from the +Z direction.
Figure 13:
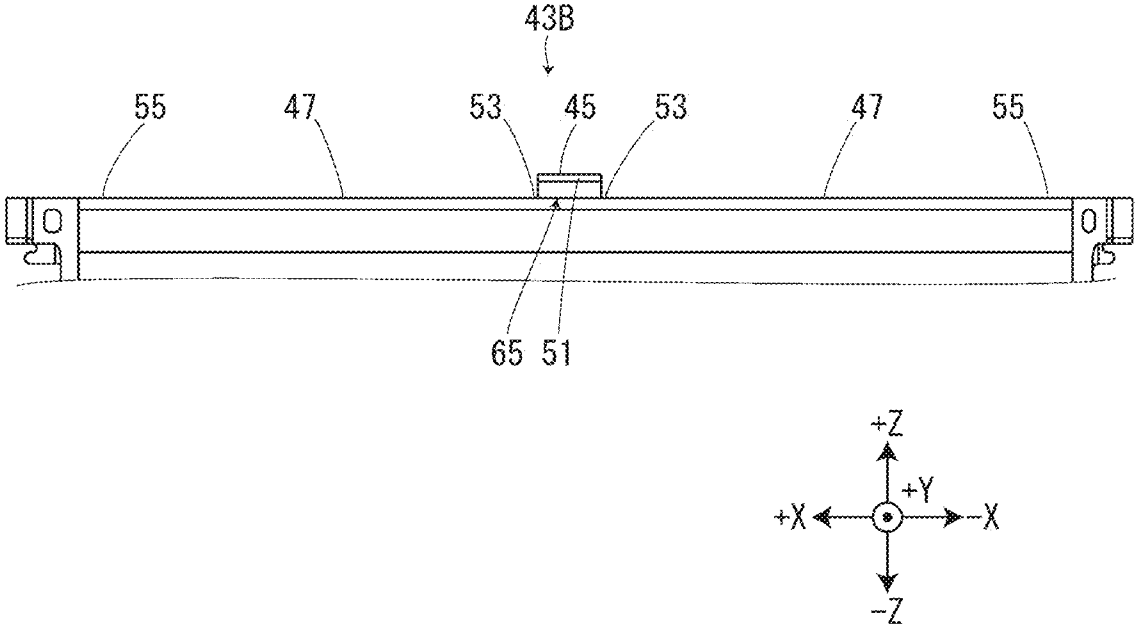
FIG. 13 is a view of the guide portion according to the second embodiment viewed from the +Y direction.

A guide portion 43B, which is a second embodiment of the guide portion, will be described with reference to FIGS. 11 to 13. Among components of the guide portion 43B, those corresponding to the components of the guide portion 43A are given the same reference numerals, and an overlapping description may be omitted.

The guide portion 43B includes a first guide portion 45, two second guide portions 47, and a second inclined portion 51.

The two second guide portions 47 are formed in a substantially rectangular shape elongated in the X direction when viewed from the +Z direction, and are provided parallel to the XY plane. That is, second A guide end portions 53 and second B guide end portions 55 are positioned at the same positions in the Z direction.

A protruding portion 65 is provided between the two second guide portions 47. The protruding portion 65 is positioned at a substantially central portion of the guide portion 43B in the X direction, and protrudes from the two second guide portions 47 in the +Z direction. The protruding portion 65 is formed in a substantially triangular prism shape with two bottom surfaces aligned in the X direction, and the first guide portion 45 and the second inclined portion 51 are implemented by the protruding portion 65. That is, an end portion of the protruding portion 65 in the +Z direction is referred to as the first guide portion 45, and an inclined surface of the protruding portion 65 that is positioned in the +Y direction with respect to the first guide portion 45 is referred to as the second inclined portion 51.

In the guide portion 43B configured as described above, the two second guide portions 47 are positioned in the −Z direction with respect to the first guide portion 45, similarly to the guide portion 43A. Therefore, the first recording paper section 109 bent in the −Z direction can be prevented from being caught by the guide portion 43B when the recording paper 101 is fed in the +Y direction in a state in which the first recording paper section 109 is coupled to the second recording paper section 111 after the recording paper 101 is cut by the cutter 21.

Figure 10:
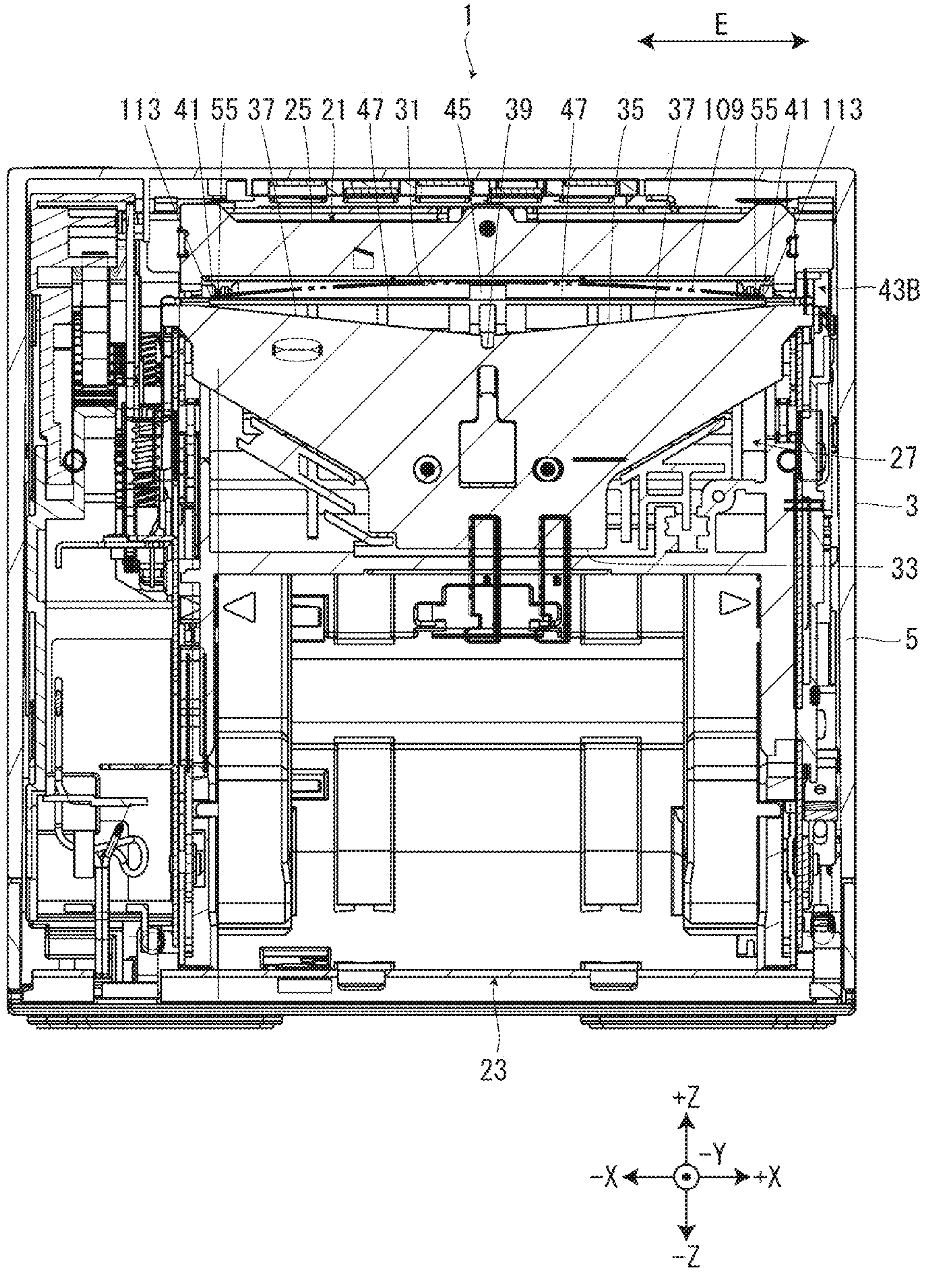
FIG. 10 is a cross-sectional view of the printing device including a guide portion according to a second embodiment, taken along a plane parallel to the XZ plane.

Further, the two second B guide end portions 55 are positioned at the same positions as the two second cutting edge portions 41 in the −Z direction (see FIG. 10). Therefore, it is possible to more effectively prevent the first recording paper section 109 from being caught by the guide portion 43B when the recording paper 101 is fed in the +Y direction in a state in which the first recording paper section 109 is coupled to the second recording paper section 111 after the recording paper 101 is cut by the cutter 21.

Since the second inclined portion 51 is provided in the +Y direction with respect to the first guide portion 45, it is possible to prevent the recording paper 101 from being caught by the guide portion 43B when the recording paper 101 is fed in the −Y direction from a state in which the leading edge of the recording paper 101 is positioned in the +Y direction with respect to the guide portion 43B.

Other Modified Examples

It goes without saying that the present disclosure is not limited to the embodiments described above, and that various configurations can be adopted without departing from the spirit of the present disclosure. For example, the above-described embodiments can be modified into the following forms. Alternatively, the embodiments and modified examples may be combined.

The cutter 21 is not limited to the configuration in which the uncut portion 107 is formed at the substantially central portion of the recording paper 101 in the paper width direction E. The cutter 21 may be configured to form the uncut portion 107 at, for example, a portion shifted toward one side of the recording paper 101 in the paper width direction E from the substantially central portion of the recording paper 101 in the paper width direction E, or to form the uncut portion 107 at one end portion of the recording paper 101 in the paper width direction E. In this case, the first guide portion 45 is provided according to the position where the uncut portion 107 is formed, so that the uncut portion 107 passes through the first guide portion 45 when the recording paper 101 is fed in the +Y direction in a state in which the first recording paper section 109 is coupled to the second recording paper section 111. For example, when the cutter 21 is configured to form the uncut portion 107 at one end portion of the recording paper 101 in the paper width direction E, the first guide portion 45 is provided at one end portion of the guide portion 43 in the paper width direction E. In this case, the number of second guide portions 47 is one.

The cutter 21 includes the fixed blade 25 and the movable blade 33 that can reciprocate in a straight line, and is not limited to a configuration in which the cutter 21 cuts the recording paper 101 by using a guillotine mechanism. The cutter 21 may include, for example, a fixed blade and a movable blade rotatable around a support shaft, and may be configured to cut the recording paper 101 by using a scissors mechanism.

Supplementary Notes

Hereinafter, the printing device will be supplementarily described.

A printing device includes: a feed roller that is configured to feed recording paper in a first direction toward a discharge port and a second direction opposite to the first direction; a cutter that is provided between the feed roller and the discharge port and cuts the recording paper in such a way as to form a cut portion and an uncut portion in the recording paper in a third direction intersecting the first direction; and a guide member that is provided between the feed roller and the cutter, in which the feed roller and the guide member are positioned in a fourth direction with respect to the recording paper fed between the feed roller and the cutter, a guide portion, which is an end portion of the guide member in a fifth direction opposite to the fourth direction, includes a first guide portion through which the uncut portion passes when the recording paper is fed in the second direction by the feed roller after the recording paper is cut by the cutter, and a second guide portion through which the cut portion passes when the recording paper is fed in the second direction by the feed roller after the recording paper is cut by the cutter, and the second guide portion is positioned in the fourth direction with respect to the first guide portion.

According to the configuration, it is possible to prevent a first recording paper section, which is a section positioned in the first direction with respect to the cut portion and the uncut portion, from being caught by the guide portion when the recording paper is fed in the second direction in a state in which the first recording paper section is coupled to a second recording paper section, which is a section positioned in the second direction with respect to the cut portion and the uncut portion, after the recording paper is cut by the cutter. The −Y direction is an example of the "first direction". The +Y direction is an example of the "second direction". The X direction is an example of the "third direction". The −Z direction is an example of the "fourth direction". The +Z direction is an example of the "fifth direction". The platen roller 17 is an example of the "feed roller".

In this case, the second guide portion may be inclined in such a way that a second A guide end portion is positioned in the fifth direction with respect to a second B guide end portion, the second A guide end portion being an end portion of the second guide portion that is adjacent to the first guide portion, and the second B guide end portion being an end portion of the second guide portion that is opposite from the first guide portion.

According to the configuration, when the recording paper is fed in the first direction from a state in which a leading edge of the recording paper is positioned in the second direction with respect to the guide portion, the leading edge of the recording paper is prevented from entering between the feed roller and the cutter not only by the first guide portion but also by a portion of the second guide portion that is near the second A guide end portion. Therefore, it is possible to more effectively prevent the leading edge of the recording paper from entering between the feed roller and the cutter as compared with a configuration in which the leading edge of the recording paper is prevented from entering between the feed roller and the cutter only by the first guide portion.

In this case, the guide portion may include a first inclined portion provided in the first direction with respect to the second guide portion, and the first inclined portion may be inclined in such a way that a first A inclined end portion is positioned in the fifth direction with respect to a first B inclined end portion, the first A inclined end portion being an end portion of the first inclined portion in the second direction, and the first B inclined end portion being an end portion of the first inclined portion in the first direction.

According to the configuration, in a case in which the recording paper is fed in the second direction in a state in which the first recording paper section is coupled to the second recording paper section after the recording paper is cut by the cutter, even when the first recording paper section abuts the first inclined portion, the first recording paper section abutting on the first inclined portion is fed in a direction between the second direction and the fifth direction along the first inclined portion. Therefore, it is possible to more effectively prevent the first recording paper section from being caught by the guide portion.

In this case, the cutter may include a first blade and a second blade that is configured to move in the fourth direction and the fifth direction, the second blade may be positioned in the fourth direction with respect to the recording paper fed between the feed roller and the cutter, a portion of a cutting edge of the second blade that is positioned at the same position as the second B guide end portion in the third direction may be a second cutting edge portion, and the second B guide end portion may be positioned at the same position as the second cutting edge portion in the fourth direction.

According to the configuration, when the recording paper is fed in the second direction in a state in which the first recording paper section is coupled to the second recording paper section after the recording paper is cut by the cutter, the first recording paper section is prevented from being positioned in the fourth direction with respect to the second B guide end portion. Accordingly, it is possible to more effectively prevent the first recording paper section from being caught by the guide portion. Further, when the recording paper is fed in the first direction from a state in which the leading edge of the recording paper is positioned in the second direction with respect to the guide portion, the recording paper is prevented from being positioned in the fourth direction with respect to the second cutting edge portion. Therefore, it is possible to prevent the recording paper from being caught by the second blade. The fixed blade 25 is an example of the "first blade". The movable blade 33 is an example of the "second blade". The movable blade side cutting edge 35 is an example of the "cutting edge of the second blade".

In this case, the guide portion may include a second inclined portion provided in the second direction with respect to the first guide portion, and the second inclined portion may be inclined in such a way that a second A inclined end portion is positioned in the fifth direction with respect to a second B inclined end portion, the second A inclined end portion being an end portion of the second inclined portion in the first direction, and the second B inclined end portion being an end portion of the second inclined portion in the second direction.

According to the configuration, in a case in which the recording paper is fed in the first direction from a state in which the leading edge of the recording paper is positioned in the second direction with respect to the guide portion, even when the leading edge of the recording paper abuts the second inclined portion, the leading edge of the recording paper abutting on the second inclined portion is fed in a direction between the first direction and the fifth direction along the second inclined portion. Accordingly, it is possible to prevent the recording paper from being caught by the guide portion.

In this case, the cutter may form the uncut portion between two cut portions, each of which is the cut portion, and the first guide portion may be provided between two second guide portions, each of which is the second guide portion.

According to the configuration, it is possible to prevent the first recording paper section from being caught by the guide portion when the recording paper in which the uncut portion is formed between two cut portions is fed in the second direction in a state in which the first recording paper section is coupled to the second recording paper section.

What is claimed is:

1. A printing device comprising:

a feed roller that is configured to feed recording paper in a first direction toward a discharge port and a second direction opposite to the first direction;

a cutter that is provided between the feed roller and the discharge port and cuts the recording paper in such a way as to form a cut portion and an uncut portion in the recording paper in a third direction intersecting the first direction; and a guide member that is provided between the feed roller and the cutter, wherein the feed roller and the guide member are positioned in a fourth direction with respect to the recording paper fed between the feed roller and the cutter, a guide portion, which is an end portion of the guide member in a fifth direction opposite to the fourth direction, includes a first guide portion through which the uncut portion passes when the recording paper is fed in the second direction by the feed roller after the recording paper is cut by the cutter, and a second guide portion through which the cut portion passes when the recording paper is fed in the second direction by the feed roller after the recording paper is cut by the cutter, the second guide portion is positioned in the fourth direction with respect to the first guide portion, and the second guide portion is inclined in such a way that a second A guide end portion is positioned in the fifth direction with respect to a second B guide end portion, the second A guide end portion being an end portion of the second guide portion that is adjacent to the first guide portion, and the second B guide end portion being an end portion of the second guide portion that is opposite from the first guide portion.

2. The printing device according to claim 1, wherein the guide portion includes a first inclined portion provided in the first direction with respect to the second guide portion, and the first inclined portion is inclined in such a way that a first A inclined end portion is positioned in the fifth direction with respect to a first B inclined end portion, the first A inclined end portion being an end portion of the first inclined portion in the second direction, and the first B inclined end portion being an end portion of the first inclined portion in the first direction.

3. The printing device according to claim 1, wherein the cutter includes a first blade and a second blade that is configured to move in the fourth direction and the fifth direction, the second blade is positioned in the fourth direction with respect to the recording paper fed between the feed roller and the cutter, a portion of a cutting edge of the second blade that is positioned at the same position as the second B guide end portion in the third direction is a second cutting edge portion, and the second B guide end portion is positioned at the same position as the second cutting edge portion in the fourth direction.

4. A printing device comprising:

a feed roller that is configured to feed recording paper in a first direction toward a discharge port and a second direction opposite to the first direction;

a cutter that is provided between the feed roller and the discharge port and cuts the recording paper in such a way as to form a cut portion and an uncut portion in the recording paper in a third direction intersecting the first direction; and a guide member that is provided between the feed roller and the cutter, wherein the feed roller and the guide member are positioned in a fourth direction with respect to the recording paper fed between the feed roller and the cutter, a guide portion, which is an end portion of the guide member in a fifth direction opposite to the fourth direction, includes a first guide portion through which the uncut portion passes when the recording paper is fed in the second direction by the feed roller after the recording paper is cut by the cutter, and a second guide portion through which the cut portion passes when the recording paper is fed in the second direction by the feed roller after the recording paper is cut by the cutter, the second guide portion is positioned in the fourth direction with respect to the first guide portion, the guide portion includes a second inclined portion provided in the second direction with respect to the first guide portion, and the second inclined portion is inclined in such a way that a second A inclined end portion is positioned in the fifth direction with respect to a second B inclined end portion, the second A inclined end portion being an end portion of the second inclined portion in the first direction, and the second B inclined end portion being an end portion of the second inclined portion in the second direction.

5. A printing device comprising:

a feed roller that is configured to feed recording paper in a first direction toward a discharge port and a second direction opposite to the first direction;

a cutter that is provided between the feed roller and the discharge port and cuts the recording paper in such a way as to form a cut portion and an uncut portion in the recording paper in a third direction intersecting the first direction; and a guide member that is provided between the feed roller and the cutter, wherein the feed roller and the guide member are positioned in a fourth direction with respect to the recording paper fed between the feed roller and the cutter, a guide portion, which is an end portion of the guide member in a fifth direction opposite to the fourth direction, includes a first guide portion through which the uncut portion passes when the recording paper is fed in the second direction by the feed roller after the recording paper is cut by the cutter, and a second guide portion through which the cut portion passes when the recording paper is fed in the second direction by the feed roller after the recording paper is cut by the cutter, the second guide portion is positioned in the fourth direction with respect to the first guide portion, the uncut portion is formed between two cut portions, each of which is the cut portion, and the first guide portion is provided between two second guide portions, each of which is the second guide portion.

* * * * *